United States Patent
Kitson et al.

(10) Patent No.: US 6,798,481 B2
(45) Date of Patent: Sep. 28, 2004

(54) LIQUID CRYSTAL ALIGNMENT

(75) Inventors: Stephen Christopher Kitson, South Gloucestershire (GB); John Christopher Rudin, London (GB); Christopher James P. Newton, Portishead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/815,999

(22) Filed: Mar. 23, 2001

(65) Prior Publication Data

US 2001/0024255 A1 Sep. 27, 2001

(30) Foreign Application Priority Data

Mar. 27, 2000 (EP) .............................. 00302480

(51) Int. Cl.[7] ....................... G02F 1/1337; G02F 1/1333
(52) U.S. Cl. ....................................... 349/129; 349/156
(58) Field of Search ................................ 349/129, 156, 349/123, 130

(56) References Cited

U.S. PATENT DOCUMENTS

| | | | | |
|---|---|---|---|---|
| 4,893,907 A | * | 1/1990 | Mallinson | ............... 350/350 S |
| 5,327,271 A | * | 7/1994 | Takeuchi et al. | ............... 359/75 |
| 5,552,611 A | * | 9/1996 | Enichen | ................... 250/491.1 |
| 5,574,593 A | * | 11/1996 | Wakita et al. | ................. 35/259 |
| 5,751,382 A | * | 5/1998 | Yamada et al. | ............... 349/12 |
| 5,872,611 A | * | 2/1999 | Hirata et al. | ................. 349/147 |
| 6,067,141 A | * | 5/2000 | Yamada et al. | ............. 349/129 |
| 6,236,445 B1 | * | 5/2001 | Foschaar et al. | ............ 349/156 |

FOREIGN PATENT DOCUMENTS

| | | | |
|---|---|---|---|
| EP | 000768560 A1 | * | 10/1995 |
| EP | 1 094 103 | | 4/2001 |
| JP | 02211422 | | 8/1990 |
| JP | 2211422 | * | 8/1990 |
| JP | 05053513 | | 3/1993 |
| JP | 5088177 | * | 4/1993 |
| JP | 05088177 | | 4/1993 |
| JP | 10148827 | * | 6/1998 |
| JP | 11311789 | | 11/1999 |
| JP | 2000206535 A | * | 7/2000 |
| WO | WO 01/40853 | | 6/2001 |

* cited by examiner

*Primary Examiner*—Robert H. Kim
*Assistant Examiner*—Hoan C. Nguyen

(57) ABSTRACT

A liquid crystal device has a surface alignment structure comprising a random or pseudorandom two dimensional array of alignment features (10) which are shaped and/or orientated to produce a desired alignment. Depending on the geometry and spacing of the features (10), the liquid crystal may be induced to adopt a planar, tilted, or homeotropic alignment.

30 Claims, 6 Drawing Sheets

LIQUID CRYSTAL ALIGNMENT

FIELD OF THE INVENTION

The present invention relates to alignment of liquid crystals in liquid crystal devices.

BACKGROUND OF THE INVENTION

Liquid crystal (LC) materials are rod-like or lath-like molecules which have different optical properties along their long and short axes. The molecules exhibit some long range order so that locally they tend to adopt similar orientations to their neighbours. The local orientation of the long axes of the molecules is referred to as the "director". There are three types of LC materials: nematic, cholesteric (chiral nematic), and smectic. For a liquid crystal to be used in a display device, it must typically be made to align in a defined manner in the "off" state and in a different defined manner in the "on" state, so that the display has different optical properties in each state. Two principal alignments are homeotropic (where the director is substantially perpendicular to the plane of the cell walls) and planar (where the director is inclined substantially parallel to the plane of the cell walls). In practice, planar alignments may be tilted with respect to the plane of a cell wall, and this tilt can be useful in aiding switching. The present invention is concerned with alignment in liquid crystal displays.

Hybrid Aligned Nematic (HAN), Vertical Aligned Nematic (VAN), Twisted nematic (TN) and super-twisted nematic (STN) cells are widely used as display devices in consumer and other products. The cells comprise a pair of opposed, spaced-apart cell walls with nematic liquid crystal material between them. The walls have transparent electrode patterns that define pixels between them.

In TN and STN displays, the inner surface of each wall is treated to produce a planar unidirectional alignment of the nematic director, with the alignment directions being at 90° to each other. This arrangement causes the nematic director to describe a quarter helix within the TN cell, so that polarised light is guided through 90° when a pixel is in the "field off" state. In an STN cell, the nematic liquid crystal is doped with a chiral additive to produce a helix of shorter pitch which rotates the plane of polarisation in the "field off" state. The "field off" state may be either white or black, depending on whether the cell is viewed through crossed or parallel polarisers. Applying a voltage across a pixel causes the nematic director to align normal to the walls in a homeotropic orientation, so that the plane of polarised light is not rotated in the "field on" state.

In a HAN cell, one wall is treated to align a nematic LC in a homeotropic alignment and the other wall is treated to induce a planar alignment, typically with some tilt to facilitate switching. The LC has positive dielectric anisotropy, and application of an electric field causes the LC directors to align normal to the walls so that the cell switches from a birefringent "field off" state to a non-birefringent "field on" state.

In the VAN mode, a nematic LC of negative dielectric anisotropy is homeotropically aligned in the "field off" state, and becomes birefringent in the "field on" state. A dichroic dye may be used to enhance contrast.

Liquid crystal (LC) planar alignment is typically effected by the unidirectional rubbing of a thin polyimide alignment layer on the interior of the LC cell, which gives rise to a unidirectional alignment with a small pretilt angle. It has been proposed to increase the pretilt angle for a rubbed surface by incorporating small projections in the rubbed alignment layer, in "Pretilt angle control of liquid-crystal alignment by using projections on substrate surfaces for dual-domain TN-LCD" T. Yamamoto et al, J. SID, 4/2, 1996.

Whilst having a desirable effect on the optical characteristics of the device, the rubbing process is not ideal as this requires many process steps, and high tolerance control of the rubbing parameters is needed to give uniform display substrates. Moreover, rubbing may cause static and mechanical damage of active matrix elements which sit under the alignment layer. Rubbing also produces dust, which is detrimental to display manufacture.

Photoalignment techniques have recently been introduced whereby exposure of certain polymer coating to polarised UV light can induce planar alignment. This avoids some of the problems with rubbing, but the coatings are sensitive to LC materials, and typically produce only low pre-tilt angles.

An alternative is to use patterned oblique evaporation of silicon oxide (SiO) to form the alignment layer. This also effects a desired optical response; however the process is complicated by the addition of vacuum deposition and a lithography process. Moreover, control of process parameters for SiO evaporation is critical to give uniformity, which is typically difficult to achieve over large areas.

A useful summary of methods of aligning liquid crystals is given in "Alignment of Nematic Liquid Crystals and Their Mixtures", J. Cognard, Mol. Cryst. Liq. Cryst. 1–78 (1982) Supplement 1.

The use of surface microstructures to align LCs has been known for many years, for example as described in "The Alignment of Liquid Crystals by Grooved Surfaces" D. W. Berriman, Mol. Cryst. Liq. Cryst. 23 215–231 1973.

It is believed that the mechanism of planar alignment involves the LC molecules aligning along the grooves to minimise distortion energy derived from deforming the LC material. Such grooves may be provided by a monograting formed in a photoresist or other suitable material.

It has been proposed in GB 2 286 467 to provide a sinusoidal bigrating on at least one cell wall, by exposing a photopolymer to an interference pattern of light generated by a laser. The bigrating permits the LC molecules to lie in two different planar angular directions, for example 45° or 90° apart. An asymmetric bigrating structure can cause tilt in one or both angular directions. Other examples of alignment by gratings are described in WO 96/24880, WO 97/14990 WO 99/34251, and "The liquid crystal alignment properties of photolithographic gratings", J. Cheng and G. D. Boyd, Appl. Phys. Lett. 35(6) Sep. 15, 1979. In "Mechanically Bistable Liquid-Crystal Display Structures", R. N. Thurston et al, IEEE trans. on Electron Devices, Vol. ED-27 No 11, November 1980, LC planar alignment by a periodic array of square structures is theorised.

LC homeotropic alignment is also a difficult process to control, typically using a chemical treatment of the surface, such as lecithin or a chrome complex. These chemical treatments may not be stable over time, and may not adhere very uniformly to the surface to be treated. Homeotropic alignment has been achieved by the use of special polyimide resins (Japan Synthetic Rubber Co.). These polyimides need high temperature curing which may not be desirable for low glass transition plastic substrates. Inorganic oxide layers may induce homeotropic alignment if deposited at suitable angles. This requires vacuum processes which are subject to the problems discussed above in relation to planar alignment. Another possibility for producing homeotropic alignment is to use a low surface energy material such as PTFE. However, PTFE gives only weak control of alignment angle and may be difficult to process.

It is desirable to have a more controllable and manufacturable alignment for LC devices.

SUMMARY OF THE INVENTION

According to an aspect of the present invention there is provided a liquid crystal device comprising a first cell wall and a second cell wall enclosing a layer of liquid crystal material;

electrodes for applying an electric field across at least some of the liquid crystal material;

a surface alignment structure on the inner surface of at least the first cell wall providing alignment to the liquid crystal molecules, wherein the said surface alignment structure comprises a random or pseudorandom two dimensional array of features which are shaped and/or orientated to produce the desired alignment.

We have surprisingly found that the orientation of the director is induced by the geometry of the features, rather than by the array or lattice on which they are arranged.

Because the features are arranged in a random or pseudorandom array instead of a regular lattice, diffraction colours which result from the use of regular grating structures are reduced and may be substantially eliminated. Such an array can act as a diffuser, which may remove the need for an external diffuser in some displays. Of course, if a diffraction colour is desired in the display, the array may be made less random, and the posts may be spaced at intervals which produce the desired interference effect. Thus, the structure may be separately optimised to give the required alignment and also to mitigate or enhance the optical effect that results from a textured surface.

Using a random or pseudorandom array also mitigates optical and LC alignment effects that arise as a result of variations of phasing between regular arrays on two surfaces, for example Moire effects.

The desired alignment features are produced without rubbing or evaporation of inorganic oxides, and hence without the problems associated with such production methods.

In a preferred embodiment, the features comprise a plurality of upstanding posts. The features could also comprise mounds, pyramids, domes, walls and other promontories which are shaped and/or orientated to permit the LC director to adopt a desired alignment for a particular display mode. Where the features are walls, they may be straight (e.g., a monograting), bent (e.g., L-shaped or chevron-shaped) or curved (e.g., circular walls). The invention will be described for convenience hereinafter with respect to posts; however it is to be understood that the invention is not limited to this embodiment. The posts may have substantially straight sides, either normal or tilted with respect to the major planes of the device, or the posts may have curved or irregular surface shape or configuration. For example, the cross section of the posts may be triangular, square, circular, elliptical or polygonal.

The term "azimuthal direction" is used herein as follows. Let the walls of a cell lie in the x,y plane, so that the normal to the cell walls is the z axis. Two tilt angles in the same azimuthal direction means two different director orientations in the same x,z plane, where x is taken as the projection of the director onto the x,y plane.

The director tends to align locally in an orientation which depends on the specific shape of the post. For an array of square posts, the director may align along either of the two diagonals of the posts. If another shape is chosen, then there may be more than two azimuthal directions, or just one. For example an equilateral triangular post can induce three directions substantially along the angle bisectors. An oval or diamond shape, with one axis longer than the others, may induce a single local director orientation which defines the azimuthal direction. It will be appreciated that such an orientation can be induced by a very wide range of post shapes. Moreover, by tilting a square post along one of its diagonals it is possible to favour one direction over another. Similarly, tilting of a cylindrical post can induce an alignment in the tilt direction.

Shorter and wider posts tend to induce a planar alignment, whilst taller and thinner posts tend to induce a homeotropic alignment. Posts of intermediate height and width can induce tilted alignments and may give rise to bistable alignments in which the director may adopt either of two tilt angles in substantially the same azimuthal direction. By providing posts of suitable dimensions and spacing, a wide range of alignment directions, planar, tilted and homeotropic, can easily be achieved, and the invention may therefore be used in any desired LC display mode.

The posts may be formed by any suitable means; for example by photolithography, embossing, casting, injection moulding, or transfer from a carrier layer. Embossing into a plastics material is particularly preferred because this permits the posts to be formed simply and at low cost. Suitable plastics materials will be well known to those skilled the art, for example poly(methyl methacrylate).

By providing a plurality of upstanding tall or thin posts on at least the first cell wall, the liquid crystal molecules can be induced to adopt a state in which the director is substantially parallel to the plane of the local surface of the posts, and normal to the plane of the cell walls.

If the posts are perpendicular to the cell walls, the LC may be homeotropically aligned at substantially 90° to the plane of the cell walls. However, for some applications it is desirable to achieve a homeotropic alignment which is tilted by a few degrees. This may readily be achieved by using posts which are inclined from the perpendicular. As the posts are inclined more, the average LC tilt angle away from the normal will increase. The invention therefore provides a simple way of inducing LC homeotropic alignment with any preferred tilt angle.

When exposing a photoresist, a desired post tilt angle can readily be achieved by exposing the photoresist through a suitable mask with a light source at an angle related to the desired angle by Snell's law as is known to allow for the refractive index of the photoresist material.

The preferred height for the posts will depend on factors such as the cell thickness, the thickness and number of the posts, and the LC material. For homeotropic alignment, the posts preferably have a vertical height which is at least equal to the average post spacing. Some or all of the posts may span the entire cell, so that they also function as spacers.

It is preferred that one electrode structure (typically a transparent conductor such as indium tin oxide) is provided on the inner surface of each cell wall in known manner. For example, the first cell wall may be provided with a plurality of "row" electrodes and the second cell wall may be provided with a plurality of "column" electrodes. However, it would also be possible to provided planar (interdigitated) electrode structures on one wall only, preferably the first cell wall.

The inner surface of the second cell wall could have low surface energy so that it exhibits little or no tendency to cause any particular type of alignment, so that the alignment of the director is determined essentially by the features on the first cell wall. However, it is preferred that the inner surface of the second cell wall is provided with a surface alignment to induce a desired alignment of the local director. This alignment may be homeotropic, planar or tilted. The alignment may be provided by an array of features of suitable shape and/or orientation, or by conventional means, for example rubbing, photoalignment, a monograting, or by treating the surface of the wall with an agent to induce homeotropic alignment.

For planar and tilted alignments, the shape of the features is preferably such as to favour only one azimuthal director orientation adjacent the features. The orientation may be the same for each feature, or the orientation may vary from feature to feature so as to give a scattering effect in one of the two states.

Alternatively, the shape of the features may be such as to give rise to a plurality of stable azimuthal director orientations. Such alignments may be useful in display modes such as bistable twisted nematic (BTN) modes. These aziumthal director orientations may be of substantially equal energy (for example vertical equilateral triangular posts will give three azimuthal alignment directions of equal energy) or one or more alignment directions may be of different energy so that although one or more lower energy alignments are favoured, at least one other stable azimuthal alignment is possible.

The liquid crystal device will typically be used as a display device, and will be provided with means for distinguishing between switched and unswitched states, for example polarisers or a dichroic dye.

The cell walls may be formed from a non-flexible material such as glass, or from rigid or flexible plastics materials which will be well known to those skilled in the art of LC display manufacture, for example poly ether sulphone (PES), poly ether ether ketone (PEEK), or poly(ethylene terephthalate) (PET).

For many displays, it is desirable to have a uniform alignment throughout the field of view. For such displays, the posts may all be of substantially the same shape, size, orientation and tilt angle. However, where variation in alignment is desired these factors, or any of them, may be varied to produced desired effects. For example, the posts may have different orientations in different regions where different alignment directions are desired. A TN cell with quartered sub-pixels is an example of a display mode which uses such different orientations, in that case to improve the viewing angle. Alternatively, if the heights of the posts are varied, the strengths of interactions with the LC will vary, and may provide a greyscale. Similarly, variation of the shape of the posts will vary the strength of interaction with the LC.

The features may optionally be provided on both walls to provide a desired local director alignment in the region of both walls. Different features may be provided on each wall, and the features may be independently varied in different regions of each wall depending on the desired alignment.

BRIEF DESCRIPTION OF THE DRAWINGS

The invention will now be further described by way of example, with reference to the following drawings in which.

DETAILED DESCRIPTION

Figure 2:
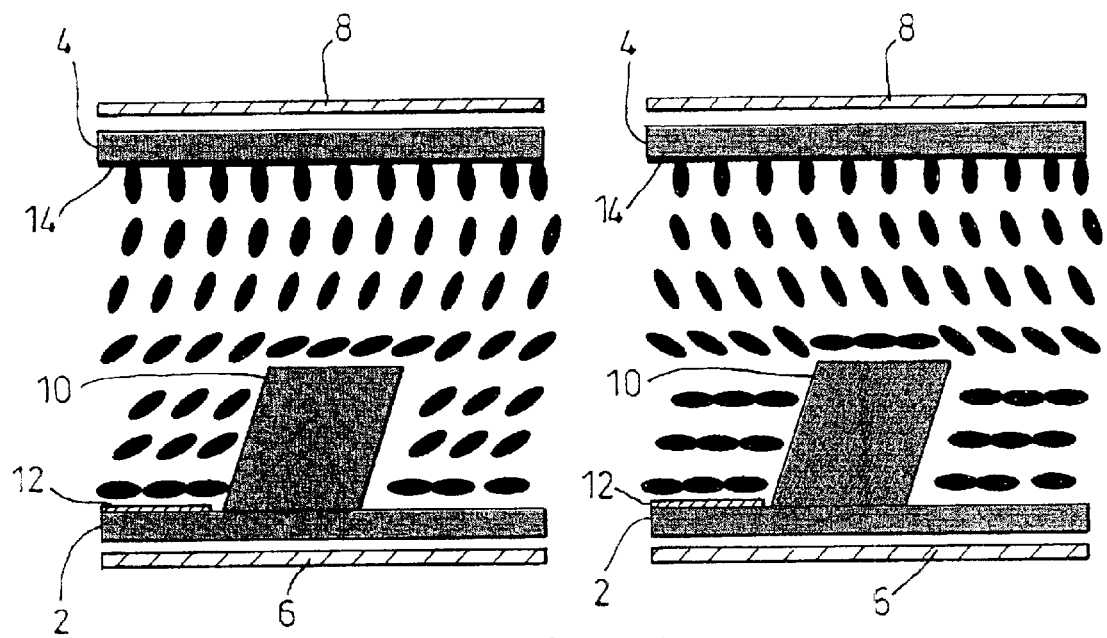
FIG. 2 is a schematic cross section, perpendicular to the cell walls, through a part of a device in accordance with another aspect of the present invention along a diagonal of a post.

The liquid crystal cell shown schematically in FIG. 2 comprises a first cell wall 2 and a second cell wall 4 which enclose a layer of nematic LC material of negative dielectric anisotropy. The molecules of the LC are represented as ellipses, with the long axis indicating the local director. The inner surface of each cell wall is provided with a transparent electrode pattern, for example row electrodes 12 on the first cell wall 2 and column electrodes 14 on the second cell wall 4, in a known manner. The LC alignment is bistable.

The inner surface of the first cell wall 2 is textured with an array of square posts 10, and the inner surface of the second cell wall 4 is flat. The posts are in a pseudorandom array, as will be described below with reference to FIG. 4. The posts 10 are approximately 1 $\mu$m high and the cell gap is typically 3 $\mu$m. The flat surface is treated to give homeotropic alignment. The posts are not homeotropically treated.

Figure 1:
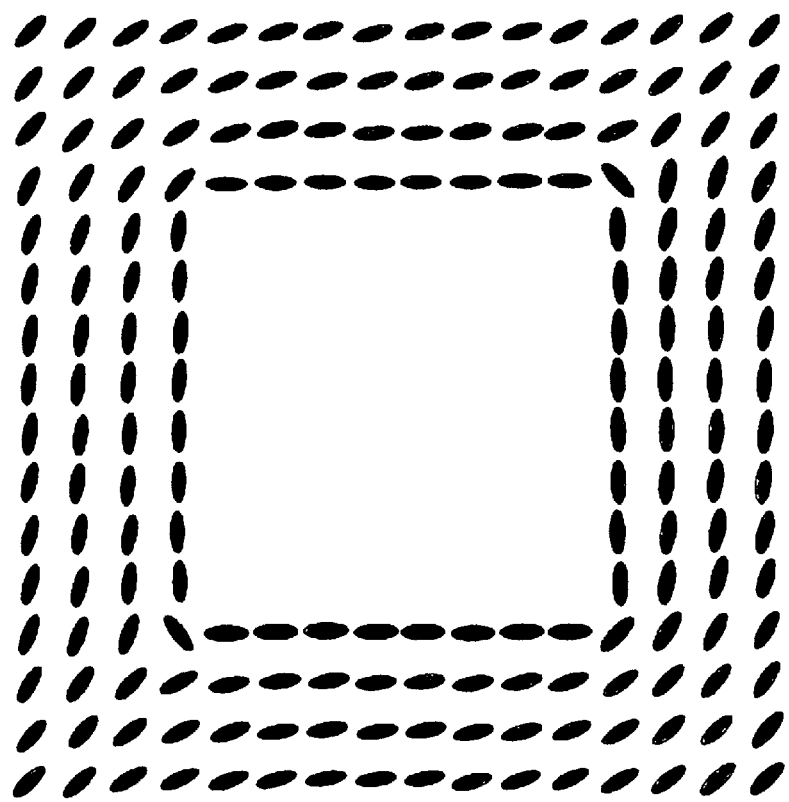
FIG. 1 is a schematic cross section, parallel to the cell walls, through a region around a post in a liquid crystal device in accordance with one aspect of the present invention. The long axes of the ellipses represent typical orientations of the LC director.

Such an array of square posts has two preferred orientations of the LC director in the azimuthal direction. These are along the two diagonals of the post. FIG. 1 shows a cross-section through a post with the LC distorted around it, from one corner to the diagonally opposite one. This alignment around the post then tends to seed the alignment of the LC above the post such that the average orientation is also along that diagonal.

By tilting the posts along one of the diagonals (FIG. 2) it is possible to favour that alignment direction. Through computer simulation of this geometry we found that although there is only one azimuthal alignment direction there are in fact two states with similar energies but which differ in how much the LC tilts. FIG. 2 is a schematic of the two states. In one state (shown on the left of FIG. 2) the LC is highly tilted, and in the other it is planar around the posts. The exact nature of the LC orientation depends on the details of the structure, but for a range of parameters there are two distinct states with different tilts. The two states may be distinguished by viewing through a polariser 8 and an analyser 6. The low tilt state has high birefringence and the high tilt state has low birefringence.

Without limiting the scope of the invention in any way, we think that the two states may arise because of the way in which the LC is deformed by the post. Flowing around a post causes regions of high energy density at the leading and trailing edges of the post where there is a sharp change in direction. This can be seen in FIG. 1 at the bottom left and top right corners of the post. This energy density is reduced if the LC molecules are tilted because there is a less severe direction change. This is clear in the limit of the molecules being homeotropic throughout the cell. In that case there is no region of high distortion at the post edges. In the higher tilt state this deformation energy is therefore reduced, but at the expense of a higher bend/splay deformation energy at the base of the posts. The LC in contact with the flat surface between posts is untilted but undergoes a sharp change of direction as it adopts the tilt around the post.

In the low tilt state the energy is balanced in the opposite sense, with the high deformation around the leading and trailing edges of the post being partially balanced by the lack of the bend/splay deformation at the base of the post because the tilt is uniform around the post. Our computer simulations suggest that, for the current configuration, the higher tilt state is the lower energy state.

This is supported by the results of computer simulation and in actual cells. When viewed at an appropriate angle between crossed polarisers the cells always cool into the darker of the two states. From FIG. 2 it would appear that the high tilt state will have lower birefringence and therefore appear darker than the low tilt state. The exact amount of tilt in the high tilt state will be a function of the elastic constants of the LC material and the planar anchoring energy of the post material.

The posts may be formed using hard contact mask exposure of a photoresist layer on a glass substrate as will described below. By way of example, the posts may be 0.7×0.7 $\mu$m across and typically up to 1.5 $\mu$m high.

Figure 4:
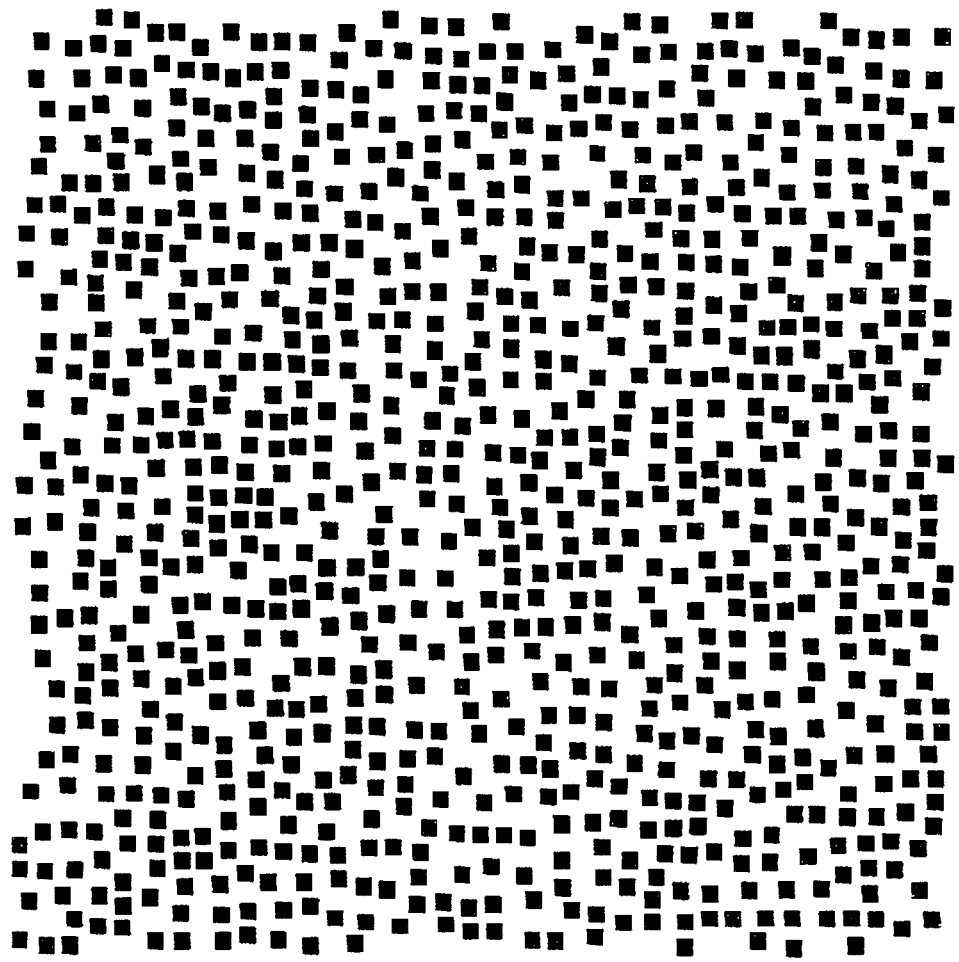
FIG. 4 is a plan view of a unit cell of a device in accordance with the present invention, having posts in a pseudorandom array.

FIG. 4 shows a unit cell of a pseudorandom array of posts. Each square post is about 0.8×0.8 $\mu$m, and the pseudorandom array has a repeat distance of 56 $\mu$m. The positions of the posts are effectively randomised, but the orientation of the posts is kept fixed. In this case, there is no regular lattice to align the LC so that any alignment must be due to the posts. We find experimentally for a HAN cell with LC material of positive dielectric anisotropy that the LC aligns along the post diagonal, just as for a regular array.

Figure 3:
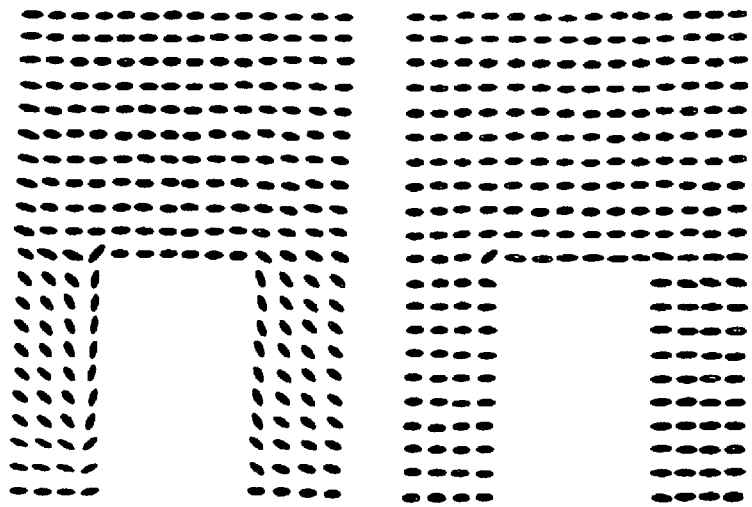
FIG. 3 is a cross section, perpendicular to the cell walls, parallel and near to a side of a post of a bistable nematic device in accordance with a further aspect of the invention.

Referring now to FIG. 3, there is shown a computer-generated model of LC alignment around a square post similar to that shown in FIG. 2, but with the inner surface of the second cell wall treated to give planar alignment. In the state shown in the left in FIG. 3, the local director is highly tilted, and in the other it is planar around the posts. As with the cell of FIG. 2, switching between the two states is achieved by the application of suitable electrical signals.

Figure 5:
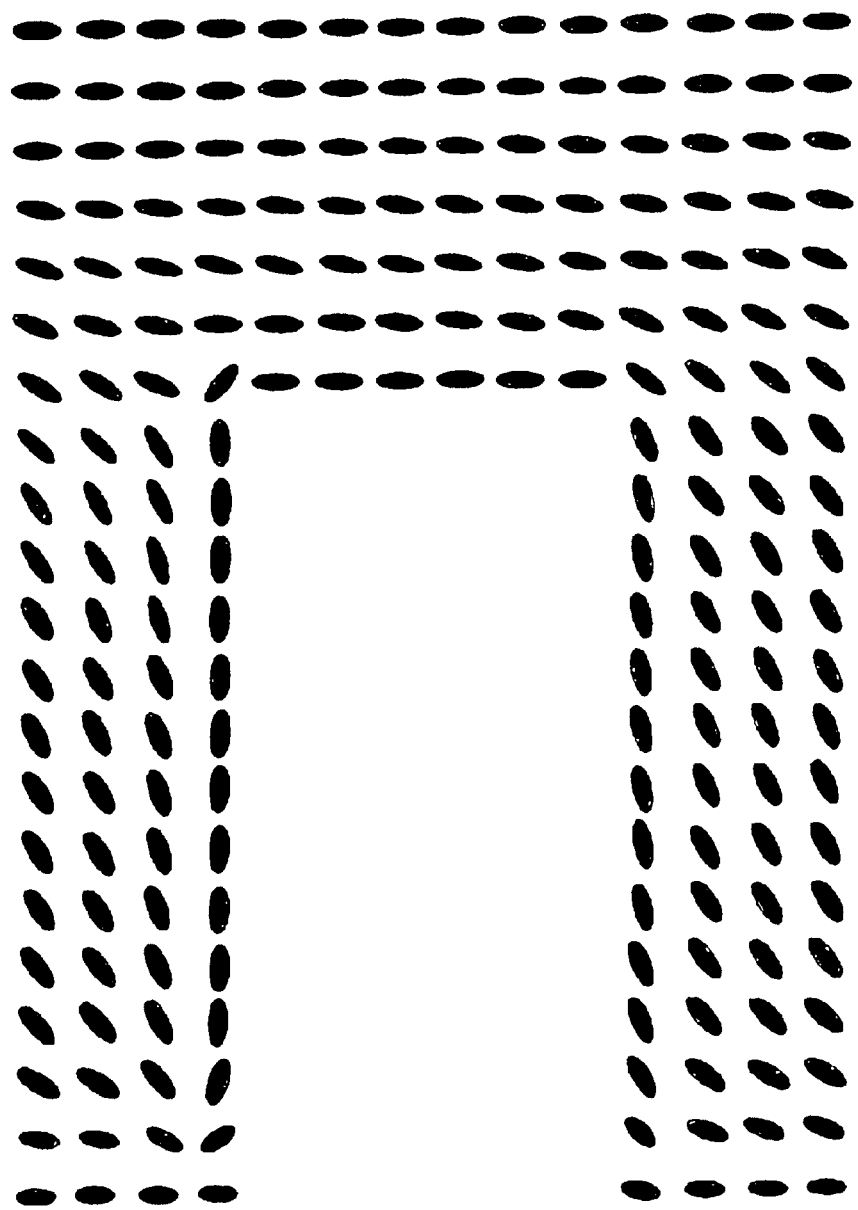
FIG. 5 is a cross section, perpendicular to the cell walls, parallel and near to a side of a post of a device in accordance with a further aspect of the invention.

We have done some computer simulation of the homeotropic alignment by posts. We have modelled 3 $\mu$m thick cells with an array of square posts which are 300 nm across on one substrate, with the other substrate flat, but modelled as a material that will give strong planar alignment. We have modelled a variety of post heights and spacings to see when the LC adopts a homeotropic alignment around the posts. FIG. 5 shows a computer simulation side view of a region containing a single post about 1.8 $\mu$m tall on the bottom substrate. Around the post the LC is strongly tilted, whilst above the post the alignment is more planar, due to the interaction with the upper substrate.

In the computer simulations we have modelled the effect of varying the post height from 0.2 to 2.6 $\mu$m, with the gap between posts varying from 0.6 to 1.2 $\mu$m. As post height is increased, the alignment goes from being just planar to being bistable or multistable between the planar state and a more tilted state. As post height is increased further, then the planar state becomes too high in energy and there is just the highly tilted homeotropic state. Present studies indicate that homeotropic alignment begins when the post height is approximately equal to the average post spacing. The effect is expected to persist down to very small cross-section posts. An expected upper limit of the post cross-section for homeotropic alignment is when the post width is of the order of the cell gap.

Figure 6:
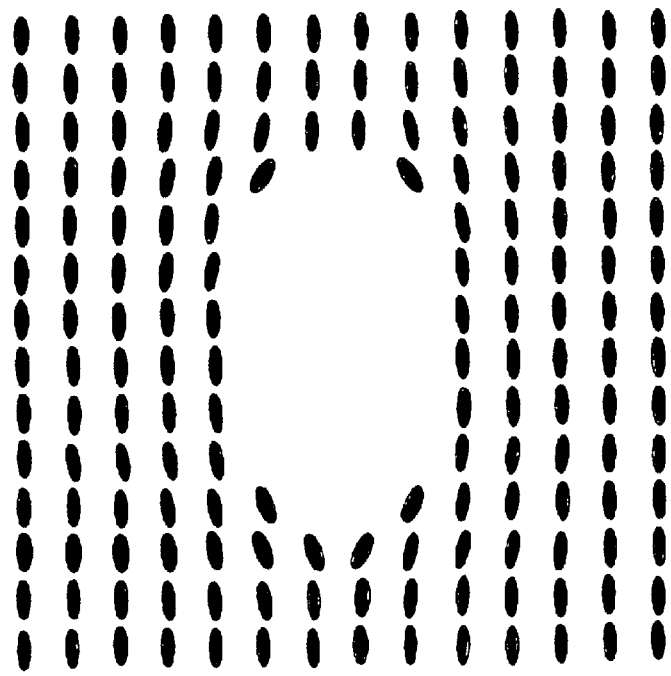
FIGS. 6 and 7 are schematic cross sectional views similar to FIG. 1 for, respectively, a post of elliptical cross section and a post of triangular cross section.
Figure 7:
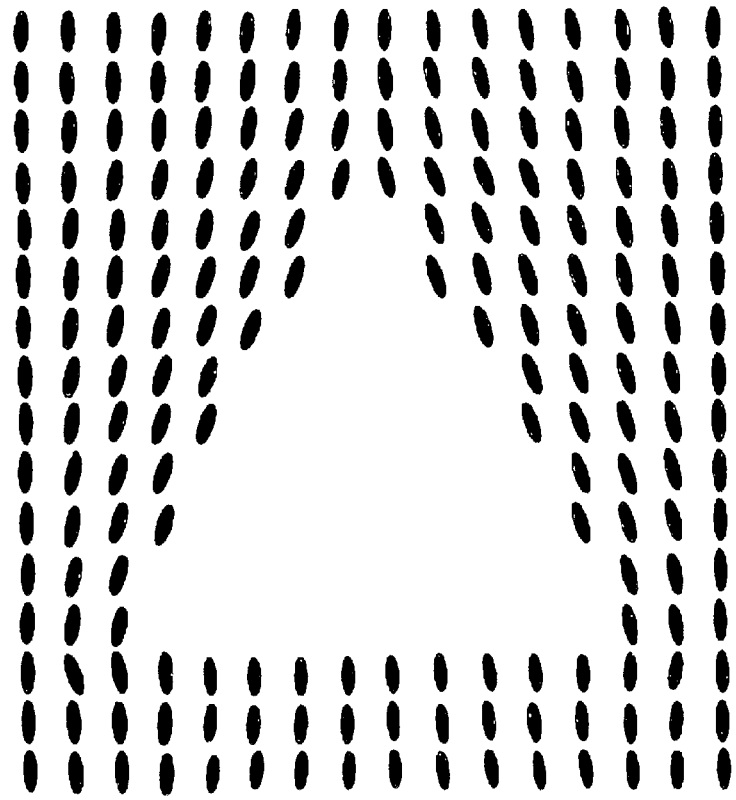

Referring now to FIGS. 6 and 7, there are shown examples of different post shapes which produce LC alignment when in a random or pseudorandom array. The post shown in FIG. 6 has an elliptical cross section, and the LC director aligns locally along the long axis of the ellipse. For the equilateral triangular post of FIG. 7 there are three director alignments possible which are equal energy, each of which is parallel to a line which bisects the triangle into equal halves. One such alignment is illustrated. By tilting the posts in the direction of one of the apices, that alignment direction can be favoured. Alternatively, elongating the triangle will cause one director orientation to be favoured. For example, an isosceles triangle will favour a director alignment along the major axis of the triangle. In each case, depending on the height of the posts, the LC adopts a locally planar or tilted planar alignment. If the inner surface of the second cell wall is treated to give local homeotropic alignment, application of an electric field will cause LC molecules of positive dielectric anisotropy to line up with the field in a homeotropic orientation. The cell therefore functions in a RAN mode. By providing a different planar alignment on the second cell wall, which could also be posts, other display modes could also be used, for example TN or (with a chirally doped LC material) STN mode.

Figure 8:
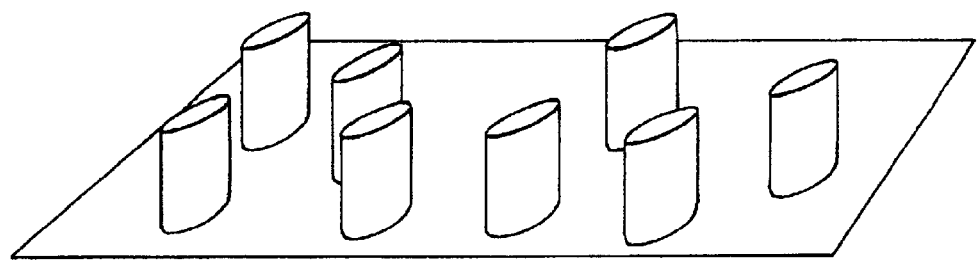
FIGS. 8 to 12 are views of different arrays of features of devices in accordance with further embodiments of the invention.
Figure 9:
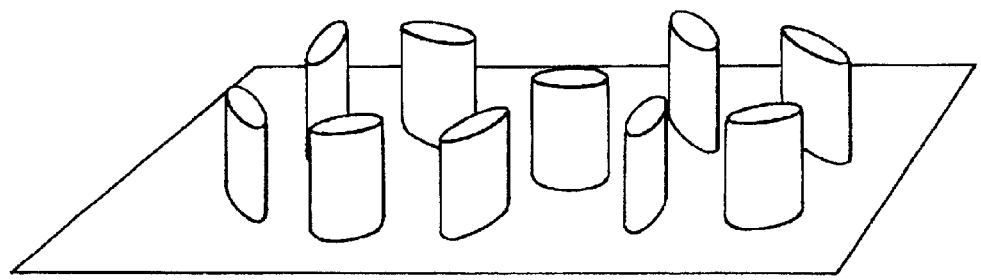
Figure 10:
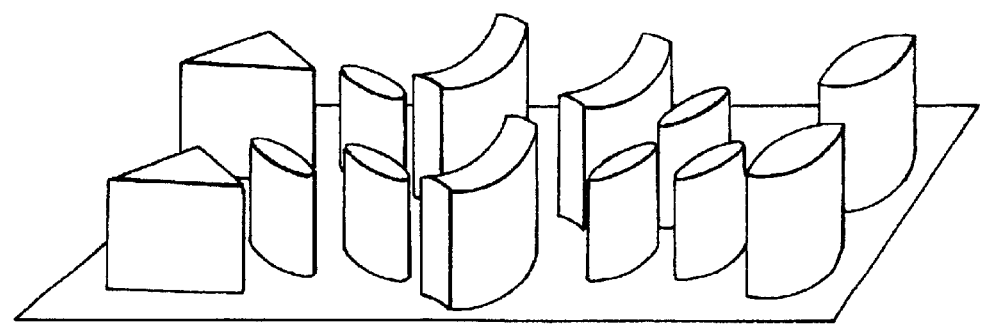
Figure 11:
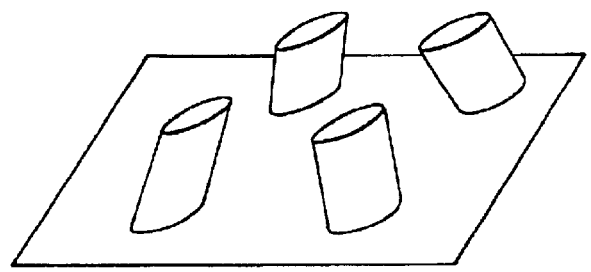
Figure 12:
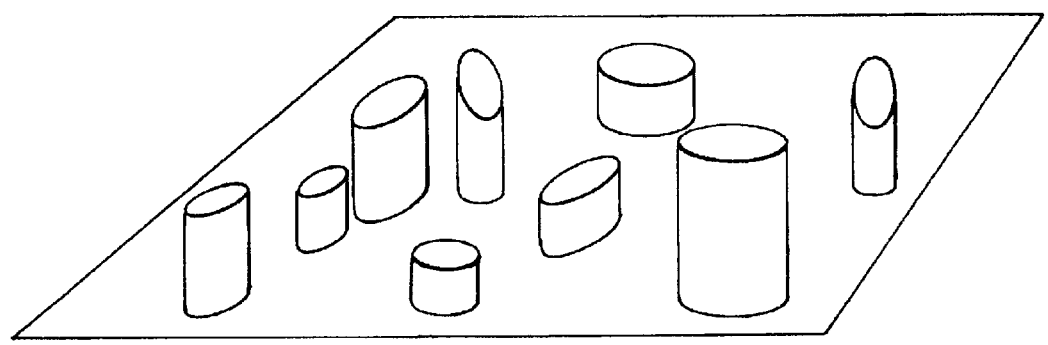

FIGS. 8 to 11 show perspective views of posts of devices in accordance with alternative embodiments of the invention. The posts are arranged in pseudorandom arrays. In FIG. 8, elliptical posts are shown, with the long axes of the ellipses parallel. Depending on their height, the posts produce either a uniform planar alignment, a bistable or multistable alignment (planar or tilted), or a homeotropic alignment (which may be tilted). In FIG. 9, elliptical posts are randomly orientated, providing an alignment structure in which there is no strongly preferred long range orientation of the nematic director. It is envisaged that this structure and others like it may be used with an LC material of positive dielectric anisotropy in a display with a scattering mode. FIG. 10 illustrates an arrangement of posts of a plurality of shapes and sizes which may be used to give controlled alignment in different areas, and different effects such as greyscale. Other arrangements and effects are of course possible. For example, the posts may be different heights in different regions, as illustrated in FIG. 12, which also shows different post sizes and orientations in a pseudorandom arrangement. The posts in FIG. 11 are tilted at different angles in different regions of the display, thereby producing different tilt angles in the LC alignment and the possibility of producing a greyscale, for example in a HAN mode. In a HAN display mode, varying the post height will give a variation in the switching performance.

Cell Manufacture

A typical process is described below, by way of non-limiting example. A clean glass substrate 2 coated with Indium Tin Oxide (ITO) is taken and electrode patterns 12 are formed using conventional lithographic and wet etch procedures. The substrate is spin-coated with a suitable photoresist (Shipley S1813) to a final thickness of 1.3 $\mu$m.

A photomask (Compugraphics International PLC) with an array of suitably-dimensioned opaque regions, for example in unit cells corresponding to FIG. 4, is brought into hard contact with the substrate and a suitable UV source is used to expose the photoresist for 10 s at ~100 mW/cm². The substrate is developed using Microposit Developer diluted 1:1 with deionised water for 20 s and rinsed dry. The substrate is flood exposed using a 365 nm UV source for 3 minutes at 30 mW/cm², and hardbaked at 85° C. for 12 hours. The substrate is then deep UV cured using a 254 nm UV source at ~50 mW/cm² for 1 hour. By exposing through the mask using a UV source at an offset angle to the normal to the plane of the cell wall, tilted posts may be produced. The tilt angle (or blaze angle) is related to the offset angle by Snell's law. The posts may have somewhat rounded edges and are not necessarily overhung. The precise shape is dependent on processing parameters as is well known and understood in the art of photolithography of fine features.

A second clean ITO substrate 4 with electrode patterns 14 is taken and treated to give a homeotropic alignment of the liquid crystal using a stearyl-carboxy-chromium complex, in a known manner.

An LC test cell is formed by bringing the substrates together using suitable spacer beads (Micropearl) contained in UV curing glue (Norland Optical Adhesives N73) around the periphery of the substrates 2, 4, and cured using 365 nm UV source. The cell is capillary filled with a nematic liquid crystal mixture of positive dielectric anisotropy, for example ZLI 2293 (Merck). It is known that switching in conventional LC devices can be improved by addition of surfactant oligomers to the LC. See, for example, G P Bryan-Brown, E L Wood and I C Sage, *Nature* Vol. 399 p 338 1999. A surfactant may optionally dissolved in the LC material. Methods of spacing, assembling and filling LC cells are well known to those skilled in the art of LCD manufacture, and such conventional methods may also be used in the spacing, assembling and filling of devices in accordance with the present invention.

What is claimed is:

1. A liquid crystal device comprising:
   a first cell wall and a second cell wall enclosing a layer of liquid crystal material;
   electrodes for applying an electric field across at least some of said liquid crystal material; and
   a surface alignment structure integrated onto an inner surface of said first cell wall providing a desired alignment to molecules of said liquid crystal material, wherein said surface alignment structure comprises one of a random or pseudorandom two dimensional array of upstanding features that are at least one of shaped and orientated to produce said desired alignment.

2. A device as claimed in claim 1, wherein the geometry and spacing of the features is such as to cause the liquid crystal material to adopt at least one of a locally planar or tilted planar alignment.

3. A device as claimed in claim 2, wherein the inner surface of the second cell wall is treated to produce a locally homeotropic alignment of the liquid crystal material, whereby the cell functions in a hybrid aligned nematic mode.

4. A device as claimed in claim 2, wherein the inner surface of the second cell wall is treated to produce at least one of a locally planar or tilted planar alignment of the liquid crystal material substantially at right angles to the alignment direction on the first cell wall, whereby the cell functions in a TN mode.

5. A device as claimed in claim 2, wherein the inner surface of the second cell wall is treated to produce at least one of a locally planar or tilted planar alignment of the liquid crystal material substantially at right angles to the alignment direction on the first cell wall, whereby the cell functions in an STN mode.

6. A device as claimed in claim 2, wherein the features are at least one of shaped and orientated so as to produce one of a substantially uniform planar or tilted planar alignment of the liquid crystal director in a single azimuthal direction.

7. A device as claimed in claim 2, wherein the features are at least one of shaped and orientated so as to produce one of a substantially uniform planar or tilted planar alignment of the liquid crystal director in a plurality of azimuthal directions.

8. A device as claimed in claim 2, wherein the features comprise posts which are tilted with respect to the normal to the plane of the first cell wall.

9. A device as claimed in claim 2, further including an analyser and a polariser mounted on the cell walls.

10. A device as claimed in claim 2, wherein the features are at least one of different height, different shape, different tilt and different orientation in different regions of the device.

11. A device as claimed in claim 2, wherein said features comprise posts, and wherein a tilt angle and orientation of the posts are uniform throughout the device.

12. A device as claimed in claim 1, wherein the geometry and spacing of the features is such as to cause the liquid crystal material to adopt a locally homeotropic alignment.

13. A device as claimed in claim 1 wherein the features are at least one of shaped and orientated so as to produce one of a substantially uniform planar or tilted planar alignment of the liquid crystal director in a single azimuthal direction.

14. A device as claimed in claim 1 wherein the features are at least one of shaped and orientated so as to produce one of a substantially uniform planar or tilted planar alignment of the liquid crystal director in a plurality of azimuthal directions.

15. A device as claimed in claim 1, wherein the features comprise posts which are tilted with respect to the normal to the plane of the first cell wall.

16. A device as claimed in claim 1, further including an analyser and a polariser mounted on the cell walls.

17. A device as claimed in claim 1, wherein the features are at least one of different height, different shape, different tilt and different orientation in different regions of the device.

18. A device as claimed in claim 1, wherein said features comprise posts, and wherein a tilt angle and orientation of the posts are uniform throughout the device.

19. A cell wall for use in manufacturing a liquid crystal device according to claim 1, comprising a substrate and a surface alignment structure on one surface thereof for aligning the director of a liquid crystal material, said surface alignment structure comprising one of a random or pseudo-random two dimensional array of upstanding features which are at least one of shaped and orientated to produce the desired alignment.

20. A liquid crystal device as claimed in claim 1, wherein said features comprise a plurality of separate and distinct upstanding features.

21. A liquid crystal device as claimed in claim 1, wherein said array of upstanding features is not treated with or formed from a material which will induce local homeotropic alignment of said liquid crystal material.

22. A liquid crystal device comprising:
   a first cell wall and a second cell wall enclosing a layer of liquid crystal material;
   electrodes for applying an electric field across at least some of said liquid crystal material;
   a surface alignment structure integrated onto an inner surface of said first cell wall providing a desired alignment to molecules of said liquid crystal material, wherein said surface alignment structure comprises one of a random or pseudorandom two dimensional array of upstanding features that are at least one of shaped and orientated to produce said desired alignment, and wherein said array of upstanding features is not treated with or formed from a material which will induce local homeotropic alignment of said liquid crystal material.

23. A liquid crystal device comprising:

a first cell wall and a second cell wall enclosing a layer of liquid crystal material;

electrodes for applying an electric field across at least some of said liquid crystal material;

a surface alignment structure integrated onto an inner surface of at least said first cell wall providing a desired alignment to molecules of said liquid crystal material, wherein said surface alignment structure comprises one of a random or pseudorandom two dimensional array of upstanding features that are at least one of shaped and orientated to produce said desired alignment, and wherein said molecules, when adjacent to said cell wall surface between said features, adopt an alignment which is one of planar and tilted planar.

24. A liquid crystal device comprising:

a first cell wall and a second cell wall enclosing a layer of liquid crystal material;

electrodes for applying an electric field across at least some of said liquid crystal material; and a surface alignment structure on said inner surface of said first cell wall providing a desired alignment to molecules of said liquid crystal material, wherein said surface alignment structure comprises one of a random or pseudorandom two dimensional array of upstanding features that are at least one of shaped and orientated to produce said desired alignment, said features having different sizes in different regions of said first cell wall.

25. A liquid crystal device comprising:

a first cell wall and a second cell wall enclosing a layer of liquid crystal material;

electrodes for applying an electric field across at least some of said liquid crystal material; and a surface alignment structure on said inner surface of said first cell wall providing a desired alignment to molecules of said liquid crystal material, wherein said surface alignment structure comprises one of a random or pseudorandom two dimensional array of upstanding features that are at least one of shaped and orientated to produce said desired alignment, and wherein said features have different shapes in different regions of said first cell wall.

26. A liquid crystal device as claimed in claim 25, wherein said features have different orientations in different regions of said first cell wall.

27. A liquid crystal device comprising:

a first cell wall and a second cell wall enclosing a layer of liquid crystal material;

electrodes for applying an electric field across at least some of said liquid crystal material; and a surface alignment structure on said inner surface of said first cell wall providing a desired alignment to molecules of said liquid crystal material, wherein said surface alignment structure comprises one of a random or pseudorandom two dimensional array of upstanding features that are at least one of shaped and orientated to produce said desired alignment, and wherein said features have different tilt angles in different regions of said first cell wall.

28. A liquid crystal device comprising:

a first cell wall and a second cell wall enclosing a layer of liquid crystal material;

electrodes for applying an electric field across at least some of said liquid crystal material; and a surface alignment structure on said inner surface of said first cell wall providing a desired alignment to molecules of said liquid crystal material, wherein said surface alignment structure comprises one of a random or pseudorandom two dimensional array of upstanding features that are at least one of shaped and orientated to produce said desired alignment, and wherein said features have different orientations in different regions of said first cell wall.

29. A liquid crystal device comprising:

a first cell wall and a second cell wall enclosing a layer of liquid crystal material;

electrodes for applying an electric field across at least some of said liquid crystal material; and a surface alignment structure on said inner surface of said first cell wall providing a desired alignment to molecules of said liquid crystal material, wherein said surface alignment structure comprises one of a random or pseudorandom two dimensional array of upstanding features that are at least one of shaped and orientated to produce said desired alignment, each of said features having the same shape and wherein said features are randomly orientated.

30. A liquid crystal device comprising:

a first cell wall and a second cell wall enclosing a layer of liquid crystal material;

electrodes for applying an electric field across at least some of said liquid crystal material; and a surface alignment structure on said inner surface of said first cell wall providing a desired alignment to molecules of said liquid crystal material, wherein said surface alignment structure comprises one of a random or pseudorandom two dimensional array of upstanding features that are at least one of shaped and orientated to produce said desired alignment, and wherein said features have a pturality of shapes and a plurality of sizes.

* * * * *